(12) United States Patent
Delong (10) Patent No.: US 8,189,915 B2
(45) Date of Patent: May 29, 2012

(54) METHOD FOR SEGMENTATION IN AN N-DIMENSIONAL FEATURE SPACE AND METHOD FOR CLASSIFYING OBJECTS IN AN N-DIMENSIONAL DATA SPACE WHICH ARE SEGMENTED ON THE BASIS OF GEOMETRIC CHARACTERISTICS

(75) Inventor: Wolf Delong, Erlangen (DE)

(73) Assignee: Carl Zeiss MicroImaging GmbH, Jena (DE)

( * ) Notice: Subject to any disclaimer, the term of this patent is extended or adjusted under 35 U.S.C. 154(b) by 1017 days.

(21) Appl. No.: 12/081,142

(22) Filed: Apr. 11, 2008

(65) Prior Publication Data

US 2008/0253654 A1 Oct. 16, 2008

Related U.S. Application Data

(63) Continuation of application No. PCT/EP2006/009623, filed on Oct. 5, 2006.

(30) Foreign Application Priority Data

Oct. 11, 2005 (DE) .......................... 10 2005 049 017

(51) Int. Cl.
*G06K 9/34* (2006.01)
(52) U.S. Cl. ...................................................... 382/173
(58) Field of Classification Search .................. 382/112, 382/155–159, 170, 173, 180–181, 190, 224–228; 706/15, 20, 31, 41
See application file for complete search history.

(56) References Cited

U.S. PATENT DOCUMENTS

| | | | | |
|---|---|---|---|---|
| 5,313,532 | A * | 5/1994 | Harvey et al. | 382/156 |
| 5,793,888 | A * | 8/1998 | Delanoy | 382/219 |
| 5,892,841 | A | 4/1999 | Jochems et al. | |
| 6,480,627 | B1 * | 11/2002 | Mathias et al. | 382/224 |
| 6,526,168 | B1 * | 2/2003 | Ornes et al. | 382/158 |
| 6,885,772 | B2 * | 4/2005 | DeLong | 382/224 |
| 2002/0165839 | A1 * | 11/2002 | Taylor et al. | 706/20 |
| 2006/0257053 | A1 | 11/2006 | Boudreau et al. | |

OTHER PUBLICATIONS

Translation of German Office Action dated Mar. 9, 2007 for parallel German application DE 10 2005 049 017.4.

* cited by examiner

*Primary Examiner* — Jose Couso
(74) *Attorney, Agent, or Firm* — Walter Ottesen

(57) ABSTRACT

A segmentation method includes several steps wherein a single data space is selected by the user in an n-dimensional feature space in a first step. This selected data space is basically interpreted by the system as containing at least two classes of objects to be segmented. In the following steps, the system first determines a separation function in the n-dimensional feature space for differentiating the at least two classes and then applies this separation function to the entire data space or a large part of the data space. The segmentation result is then visually presented to the user in real time. The invention also relates to a method for classifying objects on the basis of geometric characteristics of objects previously segmented according to any method in an n-dimensional data space. In a first step, at least two objects are selected as representatives of two different categories, then a number (m) of geometric characteristics per object is determined by calculating various whole-number wave functions. Then, the objects are classified on the basis of the defined number of geometric characteristics or partial quantities. The previously required segmentation of the objects can be carried out according to the inventive method.

23 Claims, 8 Drawing Sheets

FIG.1

Monitor

Computer

Cartesian Coordinates

Polar Coordinates

Dist

Plen

METHOD FOR SEGMENTATION IN AN N-DIMENSIONAL FEATURE SPACE AND METHOD FOR CLASSIFYING OBJECTS IN AN N-DIMENSIONAL DATA SPACE WHICH ARE SEGMENTED ON THE BASIS OF GEOMETRIC CHARACTERISTICS

CROSS REFERENCE TO RELATED APPLICATIONS

This application is a continuation application of international patent application PCT/EP 2006/009623, filed Oct. 5, 2006, designating the United States and claiming priority from German application 10 2005 049 017.4, filed Oct. 11, 2005, and the entire content of both applications is incorporated herein by reference.

FIELD OF THE INVENTION

The invention relates to a method for segmenting objects in an n-dimensional feature space which is present as a data space and a method of classification based on geometric characteristics of segmented objects in an n-dimensional data space.

BACKGROUND OF THE INVENTION

Methods of this kind are needed, for example, in the image analysis or in the evaluation of radar signals. The dimension n of the data space can amount to any desired natural number. An example for a 2-dimensional data space is, for example, the data quantity corresponding to a phase contrast image in microscopy. An example for a 3-dimensional data space is the data quantity corresponding to a color image having the color channels R-G-B and an example for a 16-dimensional data space is the data quantity corresponding to a radar image having 16 spectral channels.

According to the state of the art, the recognition of objects in images can, for example, take place with the aid of cyclical, interactive image analysis. A method of this kind is disclosed in U.S. Pat. No. 6,885,772. In this method, the image regions of interest to the user are coarsely marked by the user and a computer program classifies the complete image regions therefrom within their correct limits. It is here disadvantageous that the user must mark two regions in at least two steps, for example, the object of interest to the user and the background or two different objects which are contiguous to each other. This method is not really capable of real time because two images must be selected sequentially in time.

SUMMARY OF THE INVENTION

A first object of the invention is to provide a method for segmentation with which objects can be segmented in an n-dimensional feature space present as a data space and wherein the user need only select a single image region.

Another object of the invention is to provide a method for classification on the basis of geometric characteristics of segmented objects in an n-dimensional data space.

The two methods mentioned above are preferably implemented with a computer.

A suitable computer system and a suitable computer program product are also provided.

The segmentation method incorporates the following method steps: in a first step, a single data region in the n-dimensional feature space is selected by the user. This selected data region is so interpreted by the system that this data region contains at least two classes of objects to be segmented. In subsequent method steps, the system first determines a separation function in the n-dimensional feature space for distinguishing the at least two classes and then applies this separation function to the entire data space or a larger component quantity of the data space. This segmentation result is then visually displayed to the user in real time.

In the segmentation method of the invention, the results can be optimized in a targeted manner in a real time feedback loop while utilizing the pattern recognition capabilities of the user. Furthermore, additional features of the objects, which are to be segmented, can be inputted, for example: the number of objects in the image; relative area of the objects; minimum and maximum size; form factors such as eccentricity, fractal dimension as a measure for the smoothness of the boundary lines or other suitable characteristics. These data can be inputted by the user or automatically extracted from the image via suitable methods.

If the user is still not satisfied with the attained segmentation result, then the user can subsequently change the selected data region and so obtains, in real time, the segmentation result visually displayed which is changed by the system based on the likewise changed separation function.

In lieu of only two classes, a larger number of classes can be inputted. The number of classes can also be determined by an automatic method. Corresponding to the desired number of classes, a data region should be selected by the user which contains image points or data points of a corresponding number of classes.

The determination of the separation function can take place in that first, for each dimension of the feature space, a reference point of the features (Si) is determined via a mathematical method and thereafter all data points are projected onto all combinations of two-dimensional subspaces of the n-dimensional feature space and finally, a phase value and an amplitude value for a predetermined wave function are so determined via a two-dimensional error reduction method that a suitably defined approximation error for this wave function is minimized via a method suitable for this purpose. For sinusoidally-shaped wave functions or cosine-shaped wave functions, an approximation error of this kind is the sum of the squared differences which is minimized via the method of least error squares. The wave function is then a whole number periodic continuous function.

As methods for determining the separation function, all methods for determining separation functions for n-dimensional data sets can be applied as an alternative to the above-described method based on wave functions. Examples are methods with non-monitored learning, for example, Kohonen cards, neuronal gas algorithms and ART-networks.

If, for example, the n-dimensional feature space is a gray value distribution, the local mean value of the gray value distribution and the local variance of the gray value distribution, then the wave function is a k-number with k greater than two and the k classes resulting therefrom can be combined to at least two classes. For example, the wave function can be a threefold wave function and the three classes resulting therefrom can be combined to two classes. Especially, the two classes having the largest local variance of the gray value distribution can be combined.

As mentioned initially herein, the feature space can be three-dimensional and can contain RGB image data of a digital color image. Alternatively, the feature space can be four dimensional and can contain image data from four fluorescence channels recorded with four detectors at different light wavelengths.

The method can be applied sequentially at different locations of an object in that sequentially different data regions are selected which belong to the same object. By interpreting each of these data regions in such a manner that each data region contains at least two classes of objects to be segmented and the determination of the separation function based thereupon, there then result several classes of which subsequently at least two are again united. In this way, an object, which is embedded in two or more different backgrounds, can be so segmented that also the different backgrounds can be distinguished.

The above-mentioned method wherein the separation function is determined from a wave function can also be used for a method for classification on the basis of geometric characteristics of objects in an n-dimensional data space which were segmented in advance in accordance with a desired method. For this purpose and in a first step, at least two objects are selected as representatives for two different classes and, thereafter, a number (m) of geometric features per object are computed via computation of wave functions of different whole-number wave functions and, finally, the objects are classified on the basis of the specific number of geometric features or part quantities thereof. The segmentation of the objects required in advance can take place basically by means of any desired method, especially advantageously, however, according to a method of the present invention.

For computing the number of geometric objects, phase values and amplitude values can be computed from the wave functions. The amplitude values characterize the configuration of the objects and the phase values characterize the orientation of the objects. The amplitude values, which are computed from the wave functions, describe the configuration of the objects as invariant as to size, translation and rotation.

A computer system, which is suitable to carry out a method of the invention, should include units (1) for interactively inputting and selecting image regions and a monitor for the real time visualization of the obtained results. In addition, a processor and a data store for a computer program having a software code should be provided by means of which the method of the invention can be implemented.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
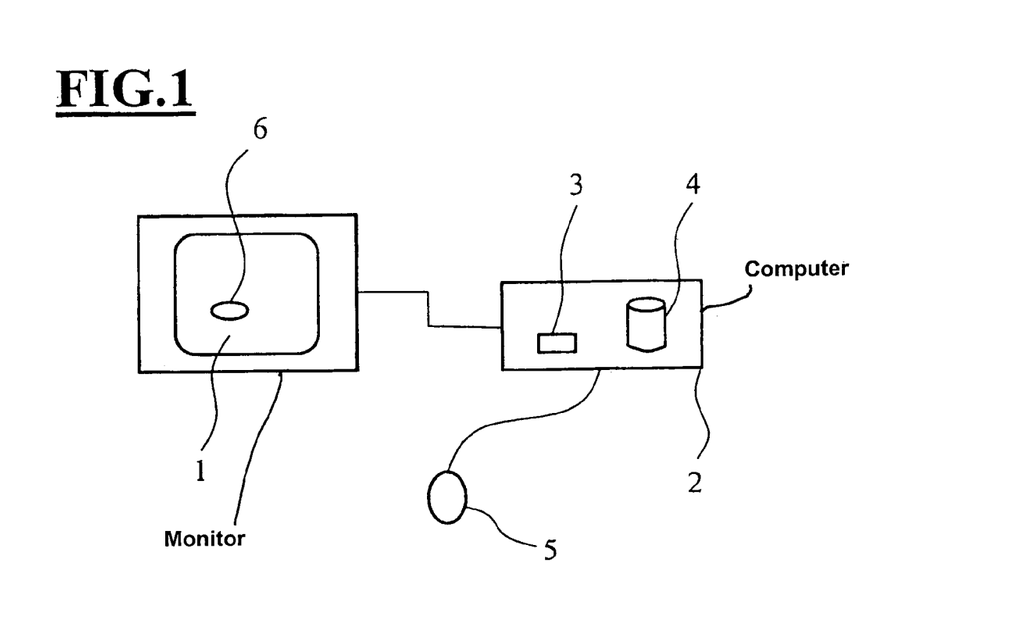
FIG. 1 is a schematic of a system suitable for carrying out the invention with the system including a computer, monitor and input unit.

In FIG. 1, a system is shown made up of a computer 2 having a built-in work memory 4 and a processor 3. A program can be loaded into the work memory 4 which makes the processor 3 capable to carry out the method of the invention. A monitor 1 and an input unit 5 are connected to the computer 2. The input unit 5 can, for example, be a mouse. With the aid of the mouse, the user can move a pinpoint region 6 relative to the image. The pinpoint region is emphasized in the image shown by the monitor 1.

Figure 4:
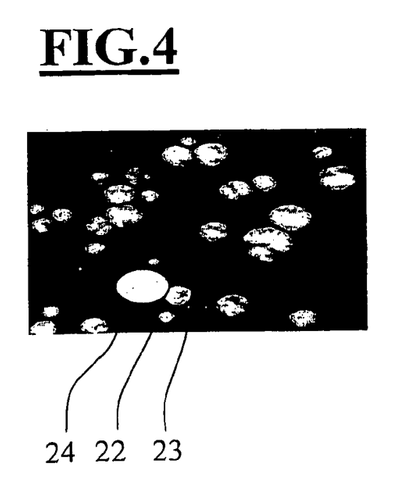
FIG. 4 is a microscope image with cells as a starting point for explaining the method of the invention.

An example of a practical image is shown in FIG. 4. The display region is here identified by reference numeral 24. The display region 24 should be so positioned relative to the image that the display region 24 includes a part of the object 23, which is to be segmented, as well as a part of the image background 22.

Figure 2:
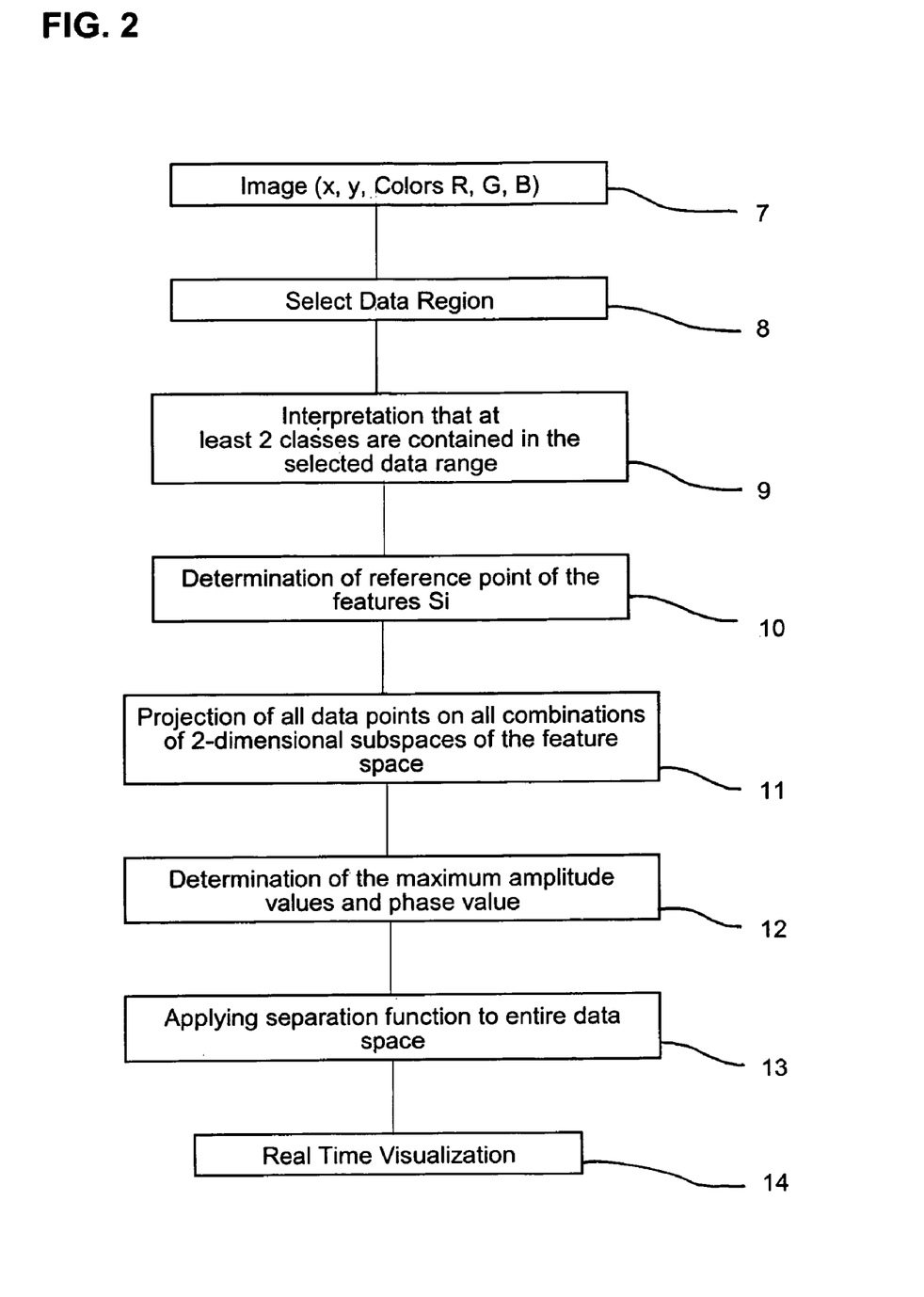
FIG. 2 is a flowchart showing the method steps carried out for the segmentation method according to the invention.

The segmentation method taking place is described hereinafter with reference to FIG. 2 in the example of a color image. In this case, the starting point is the image 7 which is present as a color brightness information in the three basic colors (red, green, blue) as a function of the two spatial coordinates (x, y). In a first step 8, the user selects a region in the image 7 which should contain the object, which is to be segmented, and the image background or image parts of two objects which are to be distinguished. The image data in this selected pinpoint region is so interpreted by the system in a subsequent step 9 that at least two classes of objects are contained in the selected pinpoint region. In the subsequent steps, a separation function is determined based on the image data in the pinpoint region. For this purpose, pertinent features, such as color brightness values in the three basic colors, are analyzed and a reference point of the different features is determined in step 10. Then, in step 11, all data points are projected onto all two-dimensional subspaces of the feature space. As will be described in still greater detail hereinafter, phase values and amplitude values result from this projection in a subsequent step 12. The phase values and amplitude values determine the separation function as a wave function. In a subsequent step 13, this separation function is applied to the entire data space or to the component space to be segmented and the result of the segmentation is displayed in real time in step 14.

Figure 5:
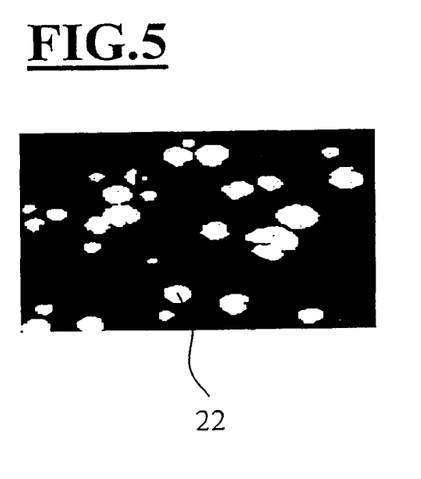
FIG. 5 shows the segmented image generated by the system from the image of FIG. 4.

As noted above, the user first points coarsely to the boundary between an object 23 and the background 24 or the boundary between two different mutually contiguous objects as indicated in FIG. 4. As in initially mentioned U.S. Pat. No. 6,885,772, the user selects for this purpose any desired formed region 22, for example, a circle, and positions this pinpointed region so that this pinpointed region overlaps a part of the object 23 and, simultaneously, a part of the background 24. The segmentation system can therefore assume that the limit of an object runs within the circle. Furthermore, the system can assume, as in U.S. Pat. No. 6,885,772, that the texture/color of the object as well as the texture/color of the background are present in the pinpoint region. This is therefore not only a simplification of the necessary work steps, but simultaneously an increase of the information content, namely, the information as to different textures/colors on the one hand and the boundary between the textures/colors on the other hand. The quantity of the selected pixels should be such that it can be divided into two (or more) disjuncted component quantities of which each one component quantity can be assigned to one of several objects or to the background. This increased information content can, for example, be used to recognize an object on-line while the user moves the pinpoint region over the image. The pinpoint region can, for example, be controlled via a mouse, a touch pad, a touch screen, a trackball, a joystick or another pinpoint instrument used in computers for moving the cursor. On the basis of the texture/color in the pinpoint region, a separation function is then determined which is applied subsequently to the entire image. The result of the segmentation is shown in FIG. 5. A wave function is preferably used as a separation function. The determination of a suitable separation function is described in greater detail hereinafter.

With the method of the invention, the user has the immediate feedback of the computer program in real time during the movement in the image with the pinpoint region whether the computer program has recognized the sought after object correctly or whether corrections are needed at some peripheral locations of the object. In this way, for example, the mean value, which is important for the classification, can be optimized by displacing the pinpoint region and likewise, the representative selection of the relevant pixel partial quantities can be optimized.

For images, which exhibit intense nonhomogeneities, an additional pinpoint region can be selected if needed which is used to expand the pixel quantity, which is to be investigated, by further representative data. There then result N separation planes from which a local classifier for the segmentation is determined for each image point via a suitable method. The following can be considered as such methods:

(a) the selection in accordance with the distance of the local point to the known separation planes or their centroidal points;
(b) the interpolation between the planes while utilizing the relative image coordinates of the exemplary objects and of the instantaneous image element (morphing);
(c) the use of self-learning measures such as linear or nonlinear neuronal networks; or,
(d) the use of all separation planes and the use of maximal distances.

However, other methods are possible in addition to the four above-mentioned methods.

Compared to the state of the art, the invention presented here affords the additional advantage that it functions in any desired high-dimensional feature spaces. An example here is the three-dimensional color space with the colors red, green and blue. A further still higher-dimensional example would be radar images having sixteen or more spectral channels.

It is emphasized that the method is not limited to image processing. The method functions in any higher-dimensional feature space which is described by locally changing scalar fields.

The classifier constructed in this manner for the separation regions is, per construction, invariant with respect to translation, rotation and stretching; With suitable further processing, the foregoing applies also to the form recognition described in greater detail hereinafter. Such invariance characteristics can be obtained according to the usual methods only via complex mathematical treatments such as local Fourier analyses or Gabor wavelets whereby the important advantage of real time capability is lost.

Segmentation by Means of Circular Wave Functions:

The color values of a certain vicinity are taken from the image for which vicinity a difference is to be computed. In the example of the color image, these color values are the three color channels having the indices 1, 2, 3. In this example, there are therefore three dimensions and for each dimension there are a number of measured values which correspond to the number of image pixels in the pinpoint region. The features 5 nm, divided in accordance with measurement values and dimensions, form, in general, an n*m matrix

| Dimensions | 1 | ... | n |
| Measurement values | 1 | ... | m |

| $S11$ | $S21$ | ... | $Sn1$ |
|---|---|---|---|
| $S12$ | $S22$ | ... | $Sn2$ |
| ... | ... | $Sik$ | ... |
| $S1m$ | $S2m$ | ... | $Snm$ |

First Computation Step:

First, the mean values of the features are computed in the individual dimensions:

$$mean_i = \frac{1}{m} * \sum_{k=1}^{m} S_{ik}$$

These mean values form reference points in the feature space. However, the reference points can also be otherwise determined in lieu of via mean value formation.

Second Computation Step:

In a follow-on second step, the coefficients of a phase matrix and an amplitude matrix are computed for all dual relationships ij wherein j>i between the dimensions from the features Sij. In the example of three colors, these are the phase coefficients $\phi_{12}$, $\phi_{13}$ and $\phi_{23}$ as well as the amplitude coefficients $amp_{12}$, $amp_{13}$ and $amp_{23}$ for the relationships red-green, red-blue and green-blue $$re_{ij} = \sum_{k=1}^{m} amp * \cos(2\varphi)$$

$$im_{ij} = \sum_{k=1}^{m} amp * \sin(2\varphi)$$

with $$\varphi = \arctan \frac{S_{ik} - m_i}{S_{jk} - m_j}$$

$$amp = \sqrt{(S_{ik} - m_i)^2 + (S_{jk} - m_j)^2}$$

$$\varphi_{ij} = 0.5 \arctan\left(\frac{im_{ij}}{re_{ij}}\right)$$

$$amp_{ij} = \frac{1}{m}\sqrt{re_{ij}^2 + im_{ij}^2}$$

In the above equations, $m_i$ and $m_j$ are the mean values in the individual dimensions which are computed in the first computation step.

Figure 6:
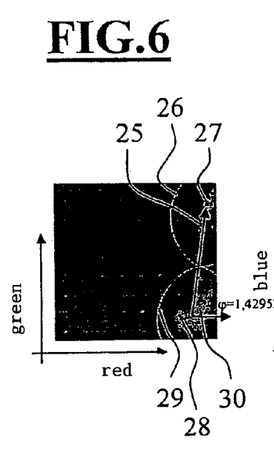
FIGS. 6 to 8 show projections into two-dimensional subspaces of an RGB image.
Figure 7:
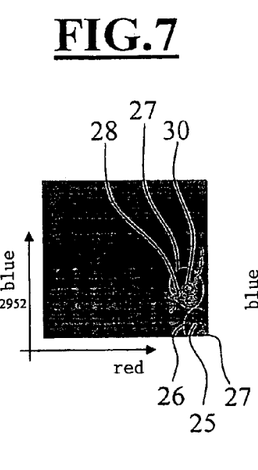
Figure 8:
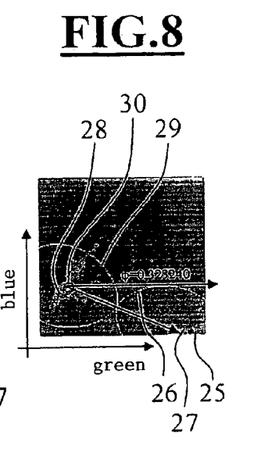

An alternative is to not use the weighting of $re_{ij}$ and $im_{ij}$ utilizing the amplitudes amp. The selection of the method results from the pregiven boundary conditions, especially the nature of the image recording process (phase contrast, multi-channel fluorescence, et cetera). The 3-dimensional color values are projected clearly into the respective planes: red-green, red-blue and green-blue. This is shown in FIGS. 6 to 8. In each of these planes, a cosine ($2\phi$) is fitted into polar coordinates in accordance to the least error square. These dumbbell-shaped formations (26, 29) divide the color values into two classes, the black measurement values 28 and the white measurement values 25. The center (27, 30) of the dumbbells (26, 29) is the mean value from the first computation step in each case.

Figure 9:
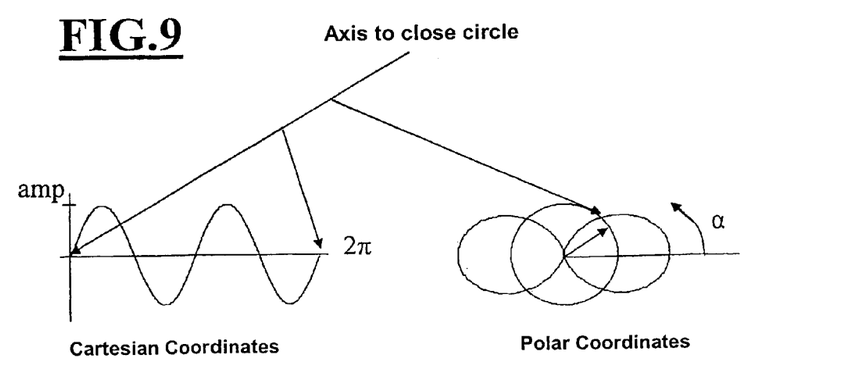
FIG. 9 provides an explanation of the generation of the dumbbells shown in FIGS. 6 to 8 from wave functions.

As shown in FIG. 9, the dumbbells result in that two sinusoidal oscillations are imaged over a circle having radius r rather than in Cartesian coordinates. The dumbbells result in this form in the event that r is selected equal to the amplitude amp of the sinusoidal oscillation. The rotation of the dumbbell relative to the axes results from the respective corresponding phase values. The dumbbell value d taken from the rotational center of the polar coordinates is then:

$$d(\alpha)=r+amp*\cos(2\alpha-\phi)$$

Figure 10:
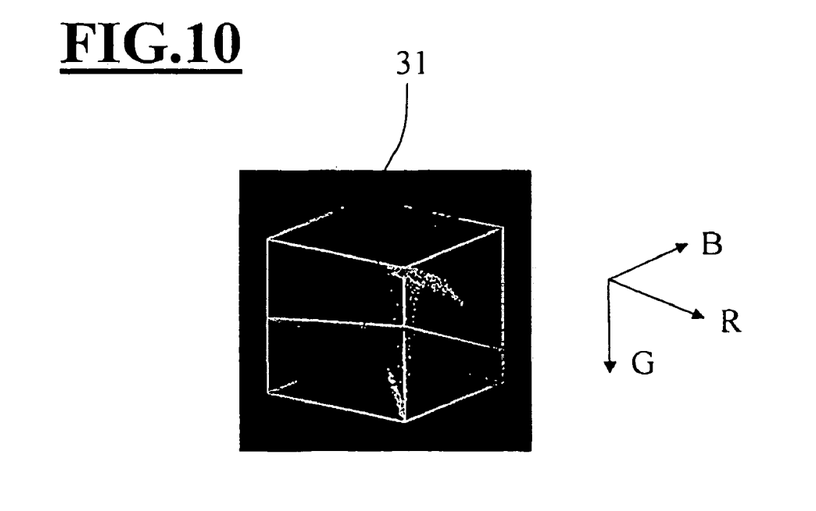
FIG. 10 is a three-dimensional schematic of a separation surface in the RGB space derived from FIGS. 6 to 8.

Third Computation Step:

In a third computation step, a separation surface 31 is now computed in the 3-dimensional color space. This separation surface is shown in FIG. 10 in 3D representation. The separation surface is determined in that the mean value from computation step 1 lies on this plane. With the following operations, the normal vector of the separation surface is also determined.

The components of the separation surface result from the maxima of the amplitudes in the amplitude matrix. Here, one starts from the plane (two-dimensional subspace of the feature space) with the largest amplitude maximum and, thereafter, the planar coefficients for the individual planes are computed in the sequence with decreasing amplitude maximum. If the largest amplitude is present in the green-blue plane, the surface components c2 and c3 result as:

$$c2=amp*\cos(\phi)$$

$$c3=amp*\sin(\phi).$$

If the next larger amplitude lies in the red-green plane, then there results the last missing surface component c1 as:

$$c1=amp*\cos(\phi).$$

With higher-dimensional data, additional planar coefficients are to be computed corresponding to a decreasing sequence of the amplitude values.

Fourth Computation Step:

The result of computation steps 1 to 3 are two vectors, namely, the vector mean from the coordinate origin to the mean value on the separation surface and the vector plane perpendicular to the separation surface. In this way, for each image point, a decision can be made based on the color value Sk of the image point as to on which side of the separation surface the image point lies or to on which object, which is to be segmented, the image point belongs. For this purpose, a threshold is first computed which results from the scalar product of the two vectors mean and plane.

Threshold=Scalar product(mean,plane)

Then the following results:

The color value lies forward of the separation surface in the event that the scalar product(Sk,plane) is less than the threshold and the color value lies rearward of the separation surface in the event that the scalar product(Sk,plane) is greater or equal to the threshold.

In the special case of gray images (=one-dimensional feature space), the computation steps 2 and 3 can be omitted. The threshold from computation step 4 is then equal to the mean value of computation step 1 because the plane from the computation step 3 then shrinks to a point. In a two-dimensional feature space, the plane from computation step 3 shrinks to a straight line.

The above method corresponds in result to the result of the known method for segmenting gray value images by determining an optimal threshold (computation of the mean value, dividing up the pixel quantities into two component quantities with the mean value as threshold, computing the mean values of the two component quantities; these mean values correspond to the centroidal points in the given method).

Figure 11:
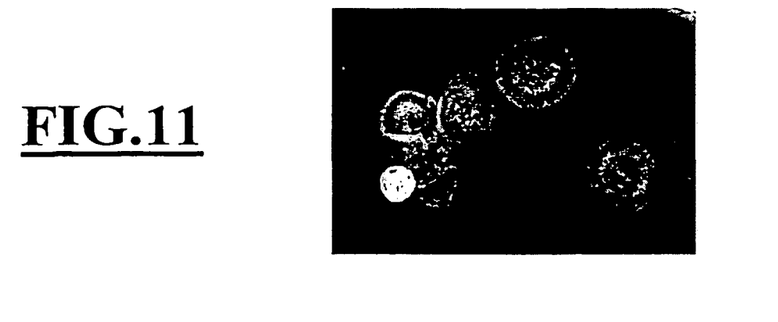
FIG. 11 is a phase contrast image as an example of a texture image.

Texture Segmentation:

With the above computation steps 1 to 4, objects can be segmented which can be distinguished from the background by their color or gray value. But there are images wherein the objects can be distinguished from the background because of their brightness distribution. An example is the image of cancer cells as shown in FIG. 11. In normal light, these cancer cells are substantially transparent. With polarized light, the cells are visible in so-called phase contrast. The objects are distinguishable from the homogeneous background by their brightness dynamic and not by a brightness region.

With the aid of the above computation steps 1 to 3, the feature space is generated which is adapted for this task. The image is transformed in advance of processing so that the real time capability again arises when utilizing three classes. For this purpose, a pinpoint region of the magnitude of, for example, 3 times 3 image points or larger is automatically used for each image point (i,j) of the image to be processed. Rather than to reconstruct the object in the image as in computation step 4, the distance of each image point from the separation surface is computed for each image point of the pinpoint region. All these distances are then summed with respect to the correct position corresponding to the location of the pinpoint region. The following applies:

$mean_{i,j}$ mean value of the pinpoint region at the location (i,j)
$plane_{i,j}$ planar vector of the pinpoint region at the location (i,j)
$thresh_{i,j}$=scalar product($mean_{i,j}$,$plane_{i,j}$)

Then:

$$Dist_{i,j} = \sum_{k=-1}^{k=+1} \sum_{l=-1}^{l=+1} scalarproduct(S_{i-k,j-l}, plane_{i,j}) - thresh_{i,j}$$

Figure 12:
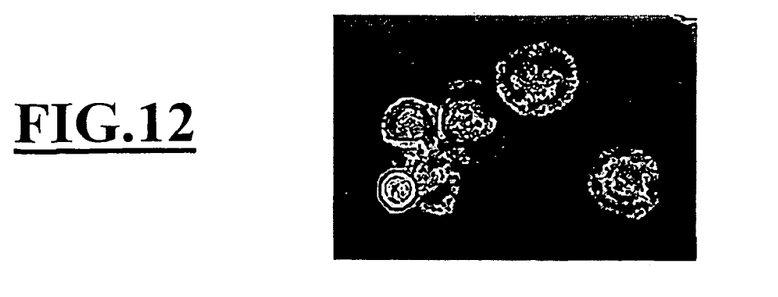
FIGS. 12 and 13 show two feature spaces, which are generated from the image in FIG. 11 via the segmentation method of the invention, with the feature spaces being suitable for the recognition of the brightness dynamic in the image in FIG. 11.

The result Dist (i,j) is shown in FIG. 12.

In addition, the lengths of the planar vector plane are likewise summed in proper position.

Then:

$$plen_{i,j}=\sqrt{scalarproduct(plane_{i,j},plane_{i,j})}$$

Then:

$$Plen_{i,j} = \sum_{k=-1}^{k=+1} \sum_{l=-1}^{l=+1} plen_{i-k,j-l}$$

Figure 13:
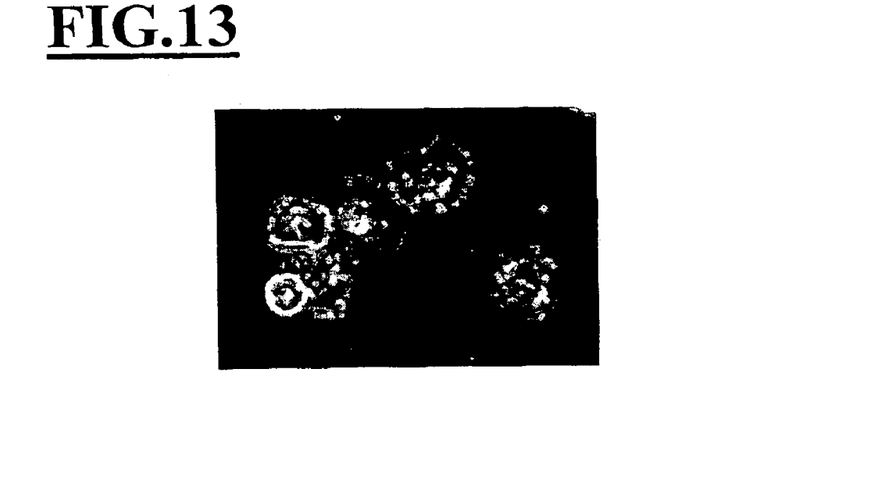

The result Plen (i,j) is shown in FIG. 13.

FIGS. 12 and 13 show a two-dimensional feature space which is suitable for the recognition of the brightness dynamic. First, the feature space must still be normalized so that both dimensions of the feature space include the same number range, for example, the number range between 0 and 1. The sigmoid function has been shown to be especially advantageous $$y=1/(1+\exp(-g(x-x_0)))$$

When m is the number of all image points, then:

$$meand = \frac{1}{m} * \sum_{k=1}^{m} Dist_k$$

$$meanp = \frac{1}{m} * \sum_{k=1}^{m} Plen_k$$

and the normalization takes place utilizing the sigmoid function in that for x, the number values of Dist or Plen are inserted and for $x_0$, meand or meanp are inserted.

Figure 14:
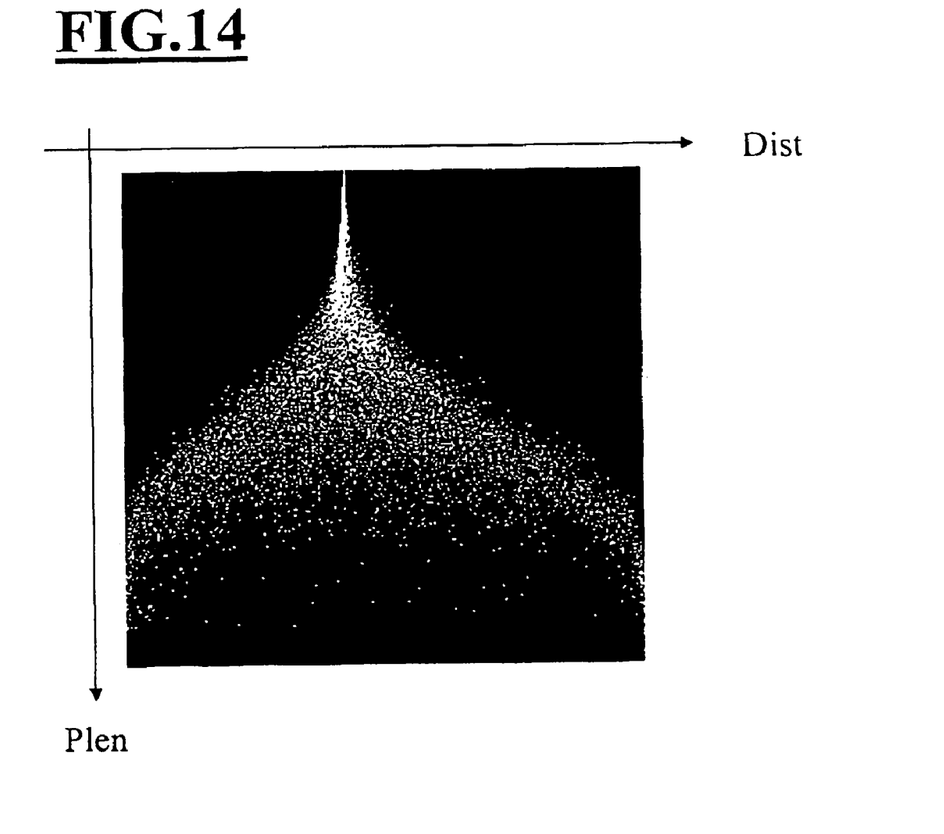
FIG. 14 is a two-dimensional histogram of the images in FIGS. 12 and 13.
Figure 15:
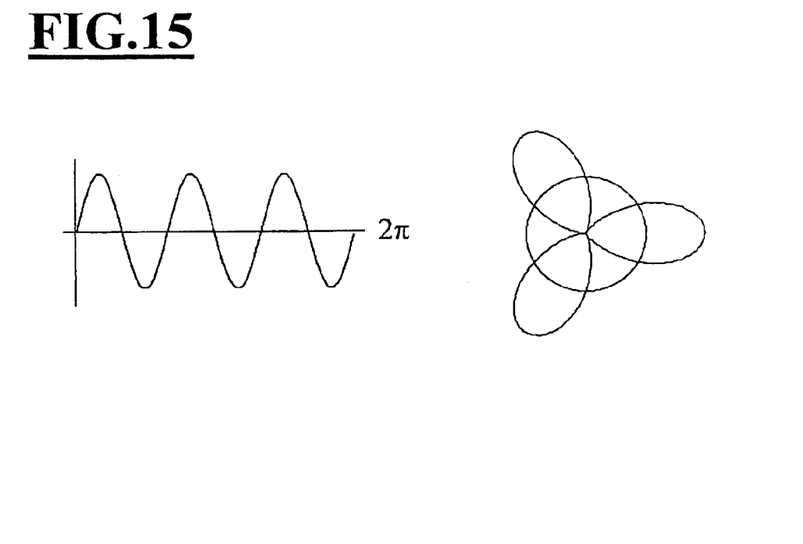
FIG. 15 shows a threefold wave function.
Figure 16:
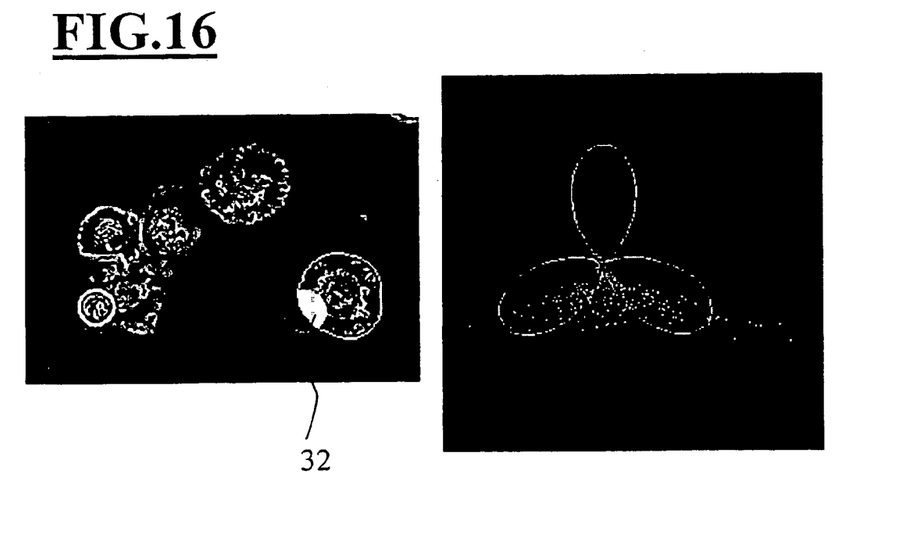
FIG. 16 shows the image of FIG. 11 and the feature space of the texture information for a selected display region; and, FIG. 17 is a set of images for explaining the form recognition.

A two-dimensional feature space can be imaged as a two-dimensional histogram which is shown in FIG. 14. The image points form a triangle in the feature space. The image points at the tip are the image points of the background. The bright image points within the objects lie in the lower right and the dark image points of the cells lie at the lower left. Such a triangular shape can be detected with a wave function of period 3. For this purpose, a cosine (3φ) is fitted in exactly the same way as in the above computation step 2. Such a wave function of the period 3 is shown in FIG. 15 to the left in Cartesian coordinates and to the right in polar coordinates. The right-hand image portion in FIG. 16 shows the feature values Dist and Plen for the pinpoint region 32 in the left image portion of FIG. 16. In the image, the image points in the phase region of the upper oscillation belong to the background and the image points in the phase region of the two lower oscillations belong to the object. The amplitude of the oscillation is an index for the quality of the recognition.

According to the state of the art, a possible alternative is the use of a Kohonen neuronal network having 3 classes as described in the text of T. Kohonen entitled "Self-Organizing Maps", Springer Verlag, ISBN 3-540-62017-6. The background is then the class having the smallest class variation and the object are the other two classes. However, there appears to be no recognizable quality of the classification which is a disadvantage.

Figure 3:
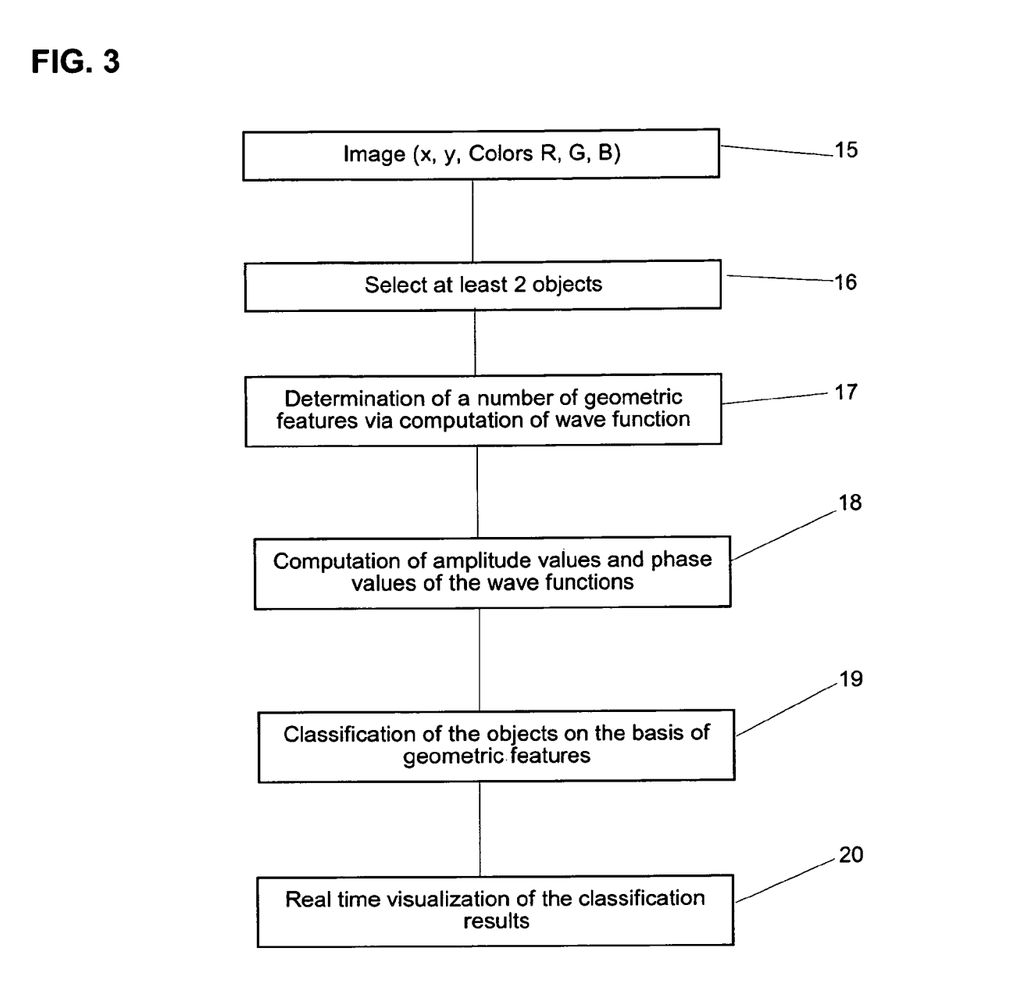
FIG. 3 is a flowchart of the method steps for carrying out the classification method according to the invention.

Form Recognition:

The method of using wave functions can also be utilized for form recognition or for the classification of objects. The corresponding method is shown in FIG. 3. In this method, the already segmented image is the start point 15. At least two objects, which are to be distinguished, are selected in a subsequent step 16 by the user. In a follow-on step 17, a number of geometric features are computed by computing wave functions. In a subsequent step 18, phase values and amplitude values are again computed from the wave functions and the objects are thereafter classified in a step 19 on the basis of the geometric features. The classification result is visualized in step 20 in real time.

Figure 17:
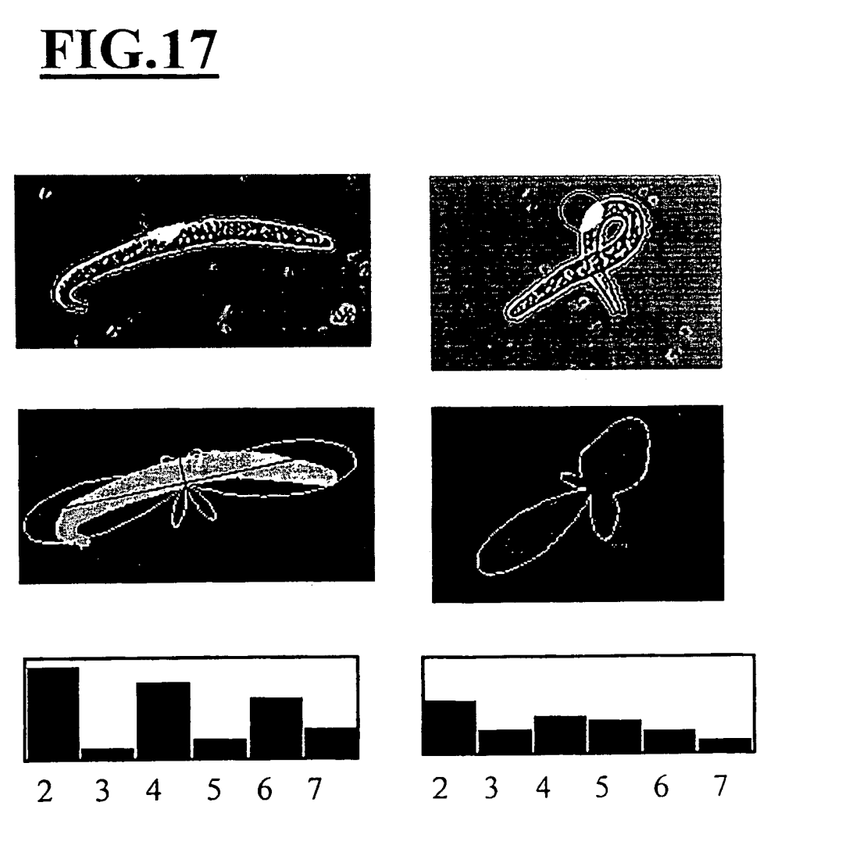

This classification method can be used, for example, for form recognition. In the example of FIG. 17, worms are recognized in phase contrast recordings utilizing texture segmentation. These worms exist in two forms, stretched (alive) (see left-hand image portion) and curled-up (dead) (see right-hand image portion). The pinpoint region, which is necessary for the wave-functions, is, for this purpose, the object itself and the image point coordinates of the object are directly the feature space. In the example of FIG. 17, the wave functions 2 (fit of a cosine (2φ) to 7 (fit of a cosine (7φ)) are computed. From this, the form coefficients are computed (from the phase values and the amplitude values of the wave functions).

The presentation follows hereinafter in program form. The procedure is fully identical to the above computation step 2.

It is assumed that xc, yc is the centroid point of the object. The computation takes place in accordance with computation step 1 as mean value in the individual dimensions x and y.

Computation step 2 as a program:
For each pixel (x, y) of the object
zx=x−xc;
zy=y−yc;
phi=atan2—zy,zx);
dist=sqrt(zx*zx+zy*zy);
distsum+=dist;
Sum formation for the coefficients
for(k=0;k<ncoefficient;k++)
dcos[k]+=dist*cos(k*phi);
dsin[k]+=dist*sin(k*phi);
Normalization
for(k=0;k<ncoefficient;k++)
amp[k]=sqrt(dcos[k]*dcos[k]+dsin[k]*dsin[k])/distsum;
  amp[k] are the form coefficients.

In FIG. 17, the form coefficients (numerical values between 2 and 7) are shown as a block diagram. This block diagram represents a six-dimensional feature space (form space). For distinguishing the two worm forms, the above-mentioned segmentation method can again be used in that the separation surface between the worm forms in this six-dimensional form space is computed by means of wave functions. The one worm form lies on the one side of the separation surface and the other worm form lies on the other side of the separation surface.

The above classification is invariant relative to translation, rotation, reflection, magnification and demagnification without a previous complex transformation of the image space into an invariant characteristic space.

It is understood that the foregoing description is that of the preferred embodiments of the invention and that various changes and modifications may be made thereto without departing from the spirit and scope of the invention as defined in the appended claims.

What is claimed is:

1. A computer system suitable for carrying out a method for classification on the basis of geometric characteristics of segmented objects in an n-dimensional data space, the method comprising the steps of:
   (a) selecting at least two objects as being representative for two different classes;
   (b) determining a number (m) of geometric features per object via computation of wave functions of different whole number wave functions; and,
   (c) classifying the objects on the basis of the specific number of geometric features or component quantities thereof.

2. The computer system of claim 1, wherein phase values and amplitude values are computed by said computer system from said wave functions; and, wherein said amplitude values characterize the form of said objects and said phase values characterize the orientation of said objects.

3. The computer system of claim 2, wherein amplitude values are computed by said computer system from said wave functions; and, said amplitude values describe the form of the objects invariantly as to size, translation and rotation.

4. A method for segmenting in an n-dimensional feature space which is present as a data space, the method comprising the steps of:
- (a) selecting a single data region of said data space;
- (b) interpreting the selected data region so as to cause said data region to contain at least two classes of objects to be segmented;
- (c) providing a computer having a processor for carrying out the following steps (d) and (e);
- (d) determining a separation function in said n-dimensional feature space to distinguish said at least two classes by:
  - (i) determining a reference point of features (Si) for each dimension of said feature space via a mathematical process;
  - (ii) projecting all data points on all combinations of two-dimensional subspaces of said n-dimensional feature space; and,
  - (iii) determining a phase value and an amplitude value of a predetermined wave function via a two-dimensional error minimization method so as to cause the approximation error in each of said subspaces to become minimal;
- (e) generalizing by applying said separation function to the entire data space or a large component quantity of said data space to obtain a result; and,
- (f) visualizing said result in real time.

5. The method of claim 4, wherein said wave function is a whole number periodic continuous function.

6. The method of claim 4, wherein said n-dimensional feature space comprises: a gray value distribution, the local mean value of the gray value distribution and the local variance of the gray value distribution; and, the wave function is a k fold with k being greater than two and the k classes resulting therefrom being combined to at least two classes.

7. The method of claim 6, wherein the wave function is three fold and the three classes resulting therefrom are combined to two classes.

8. The method of claim 7, wherein the classes having the largest local variance are combined.

9. A computer system suitable for carrying out a method for segmenting in an n-dimensional feature space which is present as a data space, the method including the steps of: (a) selecting a single data region of said data space; (b) interpreting the selected data region so as to cause said data region to contain at least two classes of objects to be segmented; (c) providing a computer having a processor for carrying out the following steps (d) and (e); (d) determining a separation function in said n-dimensional feature space to distinguish said at least two classes by:
  - (i) determining a reference point of features (Si) for each dimension of said feature space via a mathematical process;
  - (ii) projecting all data points on all combinations of two-dimensional subspaces of said n-dimensional feature space; and,
  - (iii) determining a phase value and an amplitude value of a predetermined wave function via a two-dimensional error minimization method so as to cause the approximation error in each of said subspaces to become minimal;
- (e) generalizing by applying said separation function to the entire data space or a large component quantity of said data space to obtain a result; and, (f) visualizing said result in real time; the computer system comprising:
  - a unit for interactively inputting and selecting image regions; and,
  - a monitor for visualizing said result in real time.

10. A computer program product operable on a digital computer having a memory, the computer program product comprising:
- a computer program which can be loaded into said memory of said digital computer;
- a software code for carrying out a method for segmenting in an n-dimensional feature space which is present in a data space when said program is run on said digital computer; and, said method including the steps of:
  - (a) selecting a single data region of said data space;
  - (b) interpreting the selected data region so as to cause said data region to contain at least two classes of objects to be segmented;
  - (c) utilizing the digital computer for carrying out the following steps (d) and (e);
  - (d) determining a separation function in said n-dimensional feature space to distinguish said at least two classes by:
    - (i) determining a reference point of features (Si) for each dimension of said feature space via a mathematical process;
    - (ii) projecting all data points on all combinations of two-dimensional subspaces of said n-dimensional feature space; and,
    - (iii) determining a phase value and an amplitude value of a predetermined wave function via a two-dimensional error minimization method so as to cause the approximation error in each of said subspaces to become minimal;
  - (e) generalizing by applying said separation function to the entire data space or a large component quantity of said data space to obtain a result; and,
  - (f) visualizing said result in real time.

11. A method for segmenting in an n-dimensional feature space which is present as a data space, the method comprising the steps of:
- (a) visualizing the data space as an image;
- (b) manually selecting a single data region in the image by the user, which data region contains at least an object to be segmented and image background or at least two classes of objects to be segmented;
- (c) providing a computer having a processor for carrying out the following steps (d) and (e);
- (d) determining a separation function in said n-dimensional feature space in a manner that by applying the separation function to the data region at least two classes of objects are distinguished;
- (e) applying the separation function to the entire data space or a large component quantity of said data space to obtain a result; and,
- (f) visualizing said result in real time.

12. A computer system suitable for carrying out a method for segmenting in an n-dimensional feature space which is present as a data space, the method including the steps of: (a) visualizing the data space as an image; (b) manually selecting a single data region in the image by the user, which data region contains at least an object to be segmented and image background or at least two classes of objects to be segmented; (c) providing a computer having a processor for carrying out the following steps (d) and (e); (d) determining a separation function in said n-dimensional feature space in a manner that by applying the separation function to the data region at least two classes of objects are distinguished; (e) applying the separation function to the entire data space or a large component quantity of said data space to obtain a result;

and, (f) visualizing said result in real time; the computer system comprising:

a unit for interactively inputting and selecting image regions; and, a monitor for visualizing said result in real time.

13. A computer program product comprising:

a computer program which can be loaded into the memory of a digital computer;

a software code for carrying out a method for segmenting in an n-dimensional feature space which is present in a data space when said program is run on said digital computer; and, said method including the steps of:

(a) visualizing the data space as an image;

(b) manually selecting a single data region in the image by the user, which data region contains at least an object to be segmented and image background or at least two classes of objects to be segmented;

(c) providing that the digital computer has a processor for carrying out the following steps (d) and (e);

(d) determining a separation function in said n-dimensional feature space in a manner that by applying the separation function to the data region at least two classes of objects are distinguished;

(e) applying the separation function to the entire data space or a large component quantity of said data space to obtain a result; and, (f) visualizing said result in real time.

14. The method of claim 11, wherein said separation function results from local interpolation of separation functions.

15. The method of claim 11, comprising the following further steps to determine said separation function:

(g) determining a reference point of features (Si) for each dimension of said feature space via a mathematical process;

(h) projecting all data points on all combinations of two-dimensional subspaces of said n-dimensional feature space; and, (i) determining a phase value and an amplitude value of a predetermined wave function via a two-dimensional error minimization method so as to cause the approximation error in each of said subspaces to become minimal.

16. The method of claim 15, wherein said wave function is a whole number periodic continuous function.

17. The method of claim 11, comprising the following additional steps carried out between steps (c) and (d):

(c1) carrying out steps (a) to (c) in an interactive feedback loop until the local separation function is optimized with respect to application; and, (c2) repeating steps (a) to (c1) for other objects in the image and collecting and storing the resulting separation functions.

18. The method of claim 15, wherein said n-dimensional feature space comprises: a gray value distribution, the local mean value of the gray value distribution and the local variance of the gray value distribution; and, the wave function is a k fold with k being greater than two and the k classes resulting therefrom being combined to at least two classes.

19. The method of claim 18, wherein the wave function is three fold and the three classes resulting therefrom are combined to two classes.

20. The method of claim 19, wherein the classes having the largest local variance are combined.

21. The method of claim 11, wherein said feature space is three dimensional and contains RGB image data of a digital color image.

22. The method of claim 11, wherein said feature space is four dimensional and contains image data from four fluorescence channels recorded with four detectors at different light wavelengths.

23. The method of claim 11, wherein the object is selected at more than one location and said method is carried out in accordance with steps (b) and (c) for each of the selected object regions and at least two of the classes which result are united thereafter.

* * * * *

UNITED STATES PATENT AND TRADEMARK OFFICE
CERTIFICATE OF CORRECTION

PATENT NO. : 8,189,915 B2
APPLICATION NO. : 12/081142
DATED : May 29, 2012
INVENTOR(S) : Wolf Delong

Page 1 of 1

It is certified that error appears in the above-identified patent and that said Letters Patent is hereby corrected as shown below:

In Column 6:
Line 13: delete "5 nm," and substitute -- 5nm, -- therefor.

Column 10:
Line 2: delete "(2ϕ)" and substitute -- (2ϕ)) -- therefor.
Line 15: delete "phi=atan2—zy, zx);" and substitute -- phi=atan2 (zy, zx) ; -- therefor.

Signed and Sealed this
Twenty-eighth Day of August, 2012

David J. Kappos
*Director of the United States Patent and Trademark Office*